United States Patent
Ukei et al.

(10) Patent No.: US 10,816,164 B2
(45) Date of Patent: Oct. 27, 2020

(54) LAMP REFLECTOR AND LAMINATE FOR REFLECTOR

(71) Applicant: NITTO DENKO CORPORATION, Ibaraki-shi, Osaka (JP)

(72) Inventors: Hiroichi Ukei, Osaka (JP); Takehiro Ui, Osaka (JP); Ryosuke Aoki, Osaka (JP); Hironobu Machinaga, Osaka (JP); Kazuto Yamagata, Osaka (JP); Yuuki Takeda, Osaka (JP)

(73) Assignee: NITTO DENKO CORPORATION, Ibaraki-shi, Osaka (JP)

( * ) Notice: Subject to any disclaimer, the term of this patent is extended or adjusted under 35 U.S.C. 154(b) by 0 days.

(21) Appl. No.: 16/621,842

(22) PCT Filed: Jun. 12, 2018

(86) PCT No.: PCT/JP2018/022481
§ 371 (c)(1),
(2) Date: Dec. 12, 2019

(87) PCT Pub. No.: WO2018/230579
PCT Pub. Date: Dec. 20, 2018

(65) Prior Publication Data
US 2020/0116332 A1     Apr. 16, 2020

(30) Foreign Application Priority Data

Jun. 13, 2017 (JP) ................. 2017-116295

(51) Int. Cl.
*F21V 7/22* (2018.01)
*H01Q 17/00* (2006.01)
(Continued)

(52) U.S. Cl.
CPC ................ *F21V 7/22* (2013.01); *F21S 41/37* (2018.01); *F21S 45/70* (2018.01); *H01Q 17/00* (2013.01)

(58) Field of Classification Search
CPC ...... F21V 7/22; F21V 7/24; F21V 9/00; F21S 41/37; F21S 43/33; F21S 45/70; H01Q 17/00

See application file for complete search history.

(56) References Cited

U.S. PATENT DOCUMENTS

| 2006/0216442 A1* | 9/2006 | Kamiya | ............... H01Q 1/3233 428/31 |
| 2015/0042502 A1* | 2/2015 | Gorriti Gonzalez | ... H01Q 17/00 342/1 |

(Continued)

FOREIGN PATENT DOCUMENTS

| JP | 10-223003 A | 8/1998 |
| JP | 2002-314284 A | 10/2002 |

(Continued)

OTHER PUBLICATIONS

International Search Report dated Sep. 11, 2019, issued in counterpart International Application No. PCT/JP2018/022481 (2 pages).

(Continued)

*Primary Examiner* — Alan B Cariaso
(74) *Attorney, Agent, or Firm* — Westerman, Hattori, Daniels & Adrian, LLP (57) ABSTRACT

A lamp reflector (10a) includes a mirror surface (11) and a laminate (12a). The mirror surface (11) is a surface for reflecting light from a light source (30) to guide the light in a predetermined direction. The laminate (12a) covers at least a part of the mirror surface (11) to absorb an electromagnetic wave having a specific frequency of 20 GHz to 90 GHz. The laminate (12a) allows the light from the light source (30) to transmit therethrough toward the mirror surface (11).

6 Claims, 3 Drawing Sheets (51) Int. Cl.
   *F21S 45/70*       (2018.01)
   *F21S 41/37*       (2018.01)

(56) References Cited

U.S. PATENT DOCUMENTS

2016/0254600 A1\* 9/2016 Fixter .................. H01Q 17/002
                                                       428/323
2019/0269048 A1\* 8/2019 Fujita ..................... B32B 27/18

FOREIGN PATENT DOCUMENTS

| JP | 2008-135485 A | 6/2008 |
| JP | 2010-10100 A  | 1/2010 |
| JP | 2013-93464 A  | 5/2013 |

OTHER PUBLICATIONS

Office Action dated May 20, 2020, issued in counterpart CN Application No, 201880039510.6, with English translation (11 pages).

\* cited by examiner

LAMP REFLECTOR AND LAMINATE FOR REFLECTOR

TECHNICAL FIELD

The present invention relates to a lamp reflector and a laminate for a reflector.

BACKGROUND ART

There are technologies known for installing a millimeter-wave radar in a vehicle in order to detect an object such as another vehicle.

For example, Patent Literature 1 describes a vehicle lamp including a casing, a light source and a millimeter-wave radar. The casing is composed of a lamp body having a front opening and a front cover attached by the front opening of the lamp body. The light source and the millimeter-wave radar are disposed inside the casing. The millimeter-wave radar is positioned in and integrated with the casing and directly fixed to a vehicle body.

Also, it has been considered to use, as a millimeter-wave radar to be installed in a vehicle, a radar that uses a millimeter wave having a specific frequency from 20 GHz to 90 GHz (such as 24 GHz, 76 GHz and 79 GHz).

CITATION LIST

Patent Literature

Patent Literature 1: JP 2010-010100 A

SUMMARY OF INVENTION

Technical Problem

Usually, a reflector is disposed inside a lamp such as a vehicle lamp. The reflector reflects light from a light source to guide the light in a predetermined direction. Patent Literature 1 does not describe a possibility that a reflector affects the results of detection by the millimeter-wave radar, and does not specifically study a lamp reflector that is advantageous in enhancing the reliability of the results of detection by the millimeter-wave radar.

Therefore, the present invention provides a lamp reflector that is advantageous in enhancing the reliability of the results of detection by a millimeter-wave radar. In addition, the present invention provides a laminate for a reflector, which is used for such a lamp reflector.

Solution to Problem

The present invention provides a lamp reflector including:
a mirror surface for reflecting light from a light source to guide the light in a predetermined direction; and
a laminate that covers at least a part of the mirror surface to absorb an electromagnetic wave having a specific frequency of 20 GHz to 90 GHz and allows the light from the light source to transmit therethrough toward the mirror surface.

Also, the present invention provides a laminate for a reflector, the laminate being able to adhere to a mirror surface that reflects light from a light source to guide the light in a predetermined direction in a lamp, including:
an adhesive layer for adhering the laminate to the mirror surface;
a resistive layer;
a dielectric layer that is disposed between the resistive layer and the adhesive layer; and
an electrically conductive layer that is disposed between the dielectric layer and the adhesive layer, wherein the laminate has a transmittance of 65% or more for light having a wavelength of 550 nm, and absorbs an electromagnetic wave having a specific frequency of 20 GHz to 90 GHz.

Furthermore, the present invention provides a laminate for a reflector, the laminate being able to adhere to an electrically conductive mirror surface that reflects light from a light source to guide the light in a predetermined direction in a lamp, including:
an adhesive surface that is able to adhere to the mirror surface;
a resistive layer; and
a dielectric layer that defines the adhesive surface or that is disposed in contact with a layer defining the adhesive surface, wherein the laminate for a reflector has a transmittance of 65% or more for light having a wavelength of 550 nm.

Advantageous Effects of Invention

The lamp reflector and the laminate for a reflector mentioned above make it possible to enhance the reliability of the results of detection by a millimeter-wave radar in the case where the millimeter-wave radar is disposed inside a lamp or near a lamp.

DESCRIPTION OF EMBODIMENTS

Hereinafter, embodiments of the present invention will be described with reference to the drawings. The following description describes examples of the present invention, and the present invention is not limited to the following embodiments.

The present inventors have newly found the following problems when studying a vehicle lamp. In many cases, a reflector that is disposed inside a lamp such as a vehicle lamp has, on a surface thereof, a mirror surface made of an electrically conductive material such as a metal-evaporated film. Therefore, in the case where a millimeter-wave radar is disposed inside a vehicle lamp or near a vehicle lamp, for example, there is a possibility that the reflector generates a noise. This is because when a part of millimeter waves emitted from the millimeter-wave radar is incident into the vehicle lamp for some reason, there is a possibility that the millimeter wave is reflected by the mirror surface of the reflector and reaches the millimeter-wave radar, which generates a noise. Such a noise may possibly lower the reliability of the results of detection by the millimeter-wave radar.

Therefore, the present inventors have conducted intensive studies on technologies that can enhance the reliability of the results of detection by a millimeter-wave radar in the case where the millimeter-wave radar is disposed inside a lamp or near a lamp, and have invented the lamp reflector according to the present invention.

Figure 1:
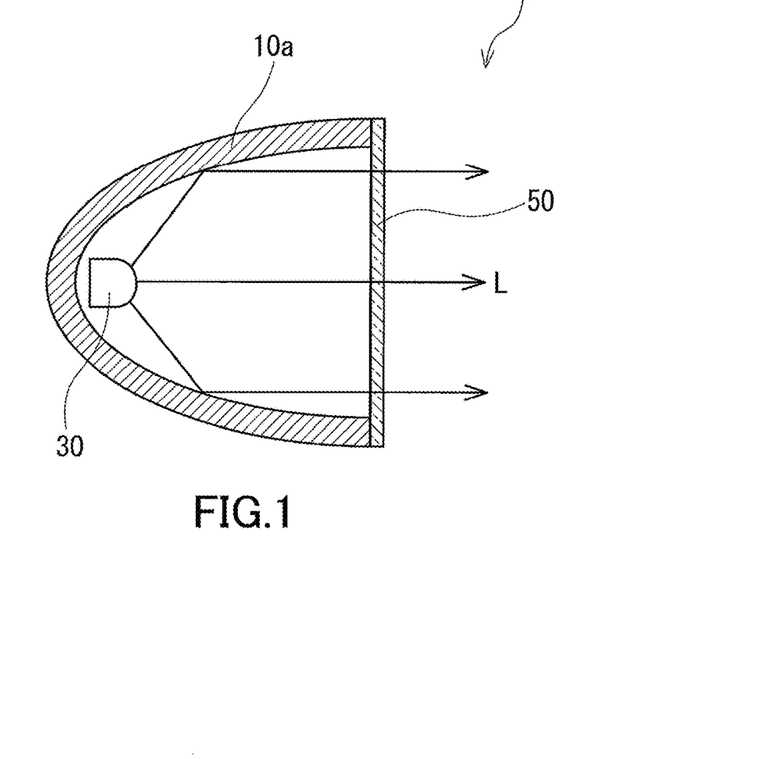
FIG. 1 is a cross-sectional view of a lamp including a lamp reflector according to an example of the present invention.

As shown in FIG. 1, a lamp 1 includes a light source 30, a lamp reflector 10a and a front cover 50. A part of light emitted from the light source 30 is reflected by the lamp reflector 10a and guided in a predetermined direction (a forward direction, for example). The front cover 50 allows the light emitted from the light source 30 to transmit therethrough. Accordingly, the front cover 50 is made of a material such as transparent plastic.

The lamp 1 is, for example, a vehicle lamp or an outdoor lamp such as a road lamp and a street lamp. The light source 30 is not particularly limited and it is, for example, a halogen lamp, an LED lamp or a high intensity discharge (HID) lamp.

Figure 2:
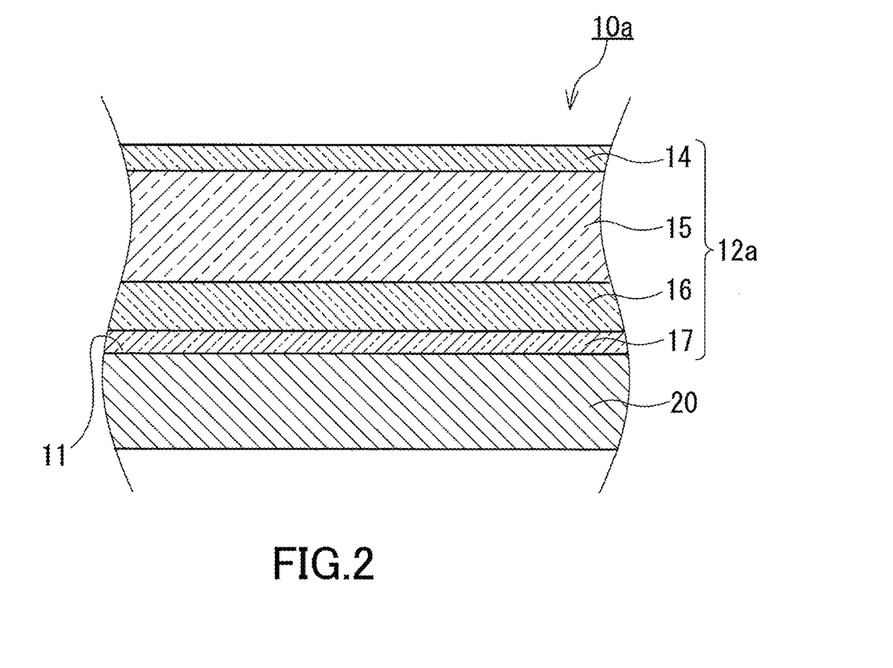
FIG. 2 is an enlarged cross-sectional view showing a part of the lamp reflector shown in FIG. 1.

As shown in FIG. 2, the lamp reflector 10a includes a mirror surface 11 and a laminate 12a. The mirror surface 11 is a surface for reflecting the light from the light source 30 to guide the light in a predetermined direction. The laminate 12a is a laminate that covers at least a part of the mirror surface 11 to absorb an electromagnetic wave having a specific frequency of 20 GHz to 90 GHz (such as 24 GHz, 76 GHz and 79 GHz).

The mirror surface 11 is formed of, for example, a metal-evaporated film formed on one principal surface of a substrate 20.

Figure 3:
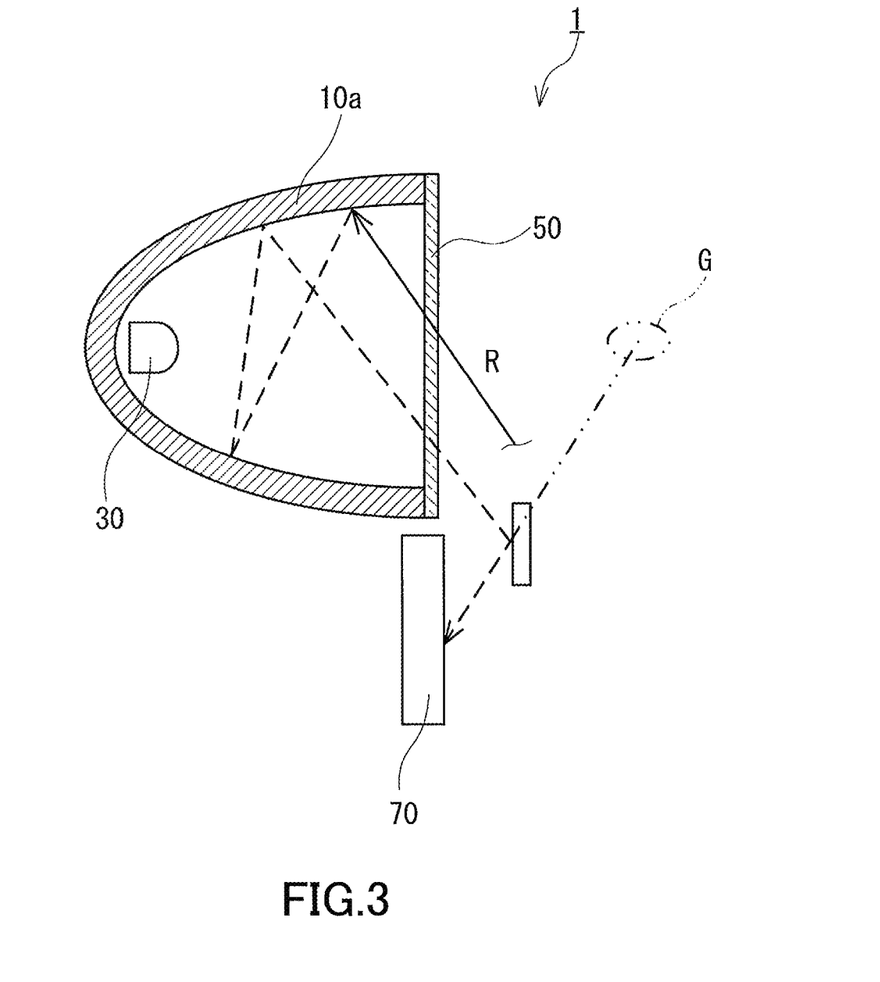
FIG. 3 is a diagram showing conceptually a relation between the lamp reflector and a millimeter-wave radar.

Assume that a millimeter-wave radar 70 is disposed near the lamp 1 as shown in FIG. 3. The millimeter-wave radar 70 is used, for example, to detect an object, such as a vehicle and a pedestrian, in a surrounding space. The millimeter-wave radar 70 emits an electromagnetic wave having a specific frequency and detects the object by receiving the electromagnetic wave reflected by the object. There is a possibility, for example, that an electromagnetic wave R emitted from the millimeter-wave radar 70 reaches inside of the lamp 1 for some reason. Here, when a conventional lamp reflector is used, the electromagnetic wave having a specific frequency is reflected inside the lamp 1 as indicated by the dashed lines shown in FIG. 3, and the millimeter-wave radar 70 may possibly receive the electromagnetic wave. In this case, the millimeter-wave radar 70 may possibly detect an object G that does not actually exist. In the lamp 1, however, the lamp reflector 10a absorbs the electromagnetic wave having a specific frequency and the reflection of the electromagnetic wave as indicated by the dashed lines shown in FIG. 3 hardly occurs. Therefore, the millimeter-wave radar 70 is free from detecting an object that does not actually exist, which makes it possible to enhance the reliability of the results of detection by the millimeter-wave radar 70.

In the lamp reflector 10a, an amount of reflection and absorption with respect to the electromagnetic wave having the specific frequency mentioned above is 15 dB or more, for example. Thereby, in the case where the millimeter-wave radar 70 is disposed inside the lamp 1 or near the lamp 1, the lamp reflector 10a can enhance the reliability of the results of detection by the millimeter-wave radar 70 more reliably.

As shown in FIG. 2, the laminate 12a includes a resistive layer 14, a dielectric layer 15 and an electrically conductive layer 16, for example. The dielectric layer 15 is disposed between the resistive layer 14 and the mirror surface 11. The electrically conductive layer 16 is disposed between the dielectric layer 15 and the mirror surface 11.

The laminate 12a typically constitutes a λ/4 electromagnetic wave absorber. The laminate 12a is designed so that incidence of an electromagnetic wave having a wavelength ($\lambda_O$) to be absorbed will result in interference between the electromagnetic wave reflected by a surface of the resistive layer 14 (front surface reflection) and the electromagnetic wave reflected by the electrically conductive layer 16 (back surface reflection). In the λ/4 electromagnetic wave absorber, the wavelength ($\lambda_O$) of an electromagnetic wave to be absorbed is determined according to a thickness (t) of the dielectric layer 15 and a relative permittivity ($\varepsilon_r$) of the dielectric layer 15, as shown in the following equation (1). That is, an electromagnetic wave having a wavelength to be absorbed can be set by appropriately adjusting the material and thickness of the dielectric layer 15. In the equation (1), sqrt ($\varepsilon_r$) means a square root of the relative permittivity ($\varepsilon_r$).

$$\lambda_O = 4t \times \text{sqrt}(\varepsilon_r) \quad \text{Equation (1)}$$

The resistive layer 14 is disposed to reflect an electromagnetic wave having a wavelength to be absorbed in the vicinity of a surface of the lamp reflector 10a. The resistive layer 14 has a sheet resistance of, for example, 200 to 600Ω/□ and desirably 360 to 500Ω/□. This makes it easy for the lamp reflector 10a to selectively absorb an electromagnetic wave having a wavelength generally employed by a millimeter-wave radar. For example, the lamp reflector 10a can effectively attenuate an electromagnetic wave having a frequency of 20 to 90 GHz employed by a millimeter-wave radar.

The resistive layer 14 has a high light transmittance in order to allow the light from the light source 30 to transmit therethrough toward the mirror surface 11.

The resistive layer 14 includes, for example, a layer (hereinafter referred to as a "resistive functional layer") composed of: a metal oxide containing, as a main component, at least one selected from the group consisting of indium, tin and zinc; a polymer having electrical conductivity; a carbon nanotube; a metal nanowire; or a metal mesh. In particular, the resistive functional layer of the resistive layer 14 is desirably composed of an indium tin oxide (ITO) in terms of the stability of the sheet resistance in the resistive layer 14 and the durability of the resistive layer 14. In this case, the material forming the resistive functional layer of the resistive layer 14 is desirably an ITO containing 20 to 40 weight % of $SnO_2$, and more desirably an ITO containing 25 to 35 weight % of $SnO_2$. An ITO containing $SnO_2$ in such ranges has an extremely stable amorphous structure and can suppress variation in the sheet resistance of the resistive layer 14 in a hot and humid environment. The sheet resistance of the resistive layer 14 refers to a value obtained by measuring, for example, a surface defined by the resistive functional layer. In the present description, a "main component" means a component having the largest content on mass basis.

The resistive layer 14 may further include, for example, a support supporting the resistive functional layer. In this case, the resistive layer 14 can be produced, for example, by forming the resistive functional layer on the support by a layer forming method such as sputtering and coating (bar coating, for example). In this case, the support also serves as an auxiliary member capable of adjusting a thickness of the resistive functional layer with high accuracy. In this case, examples of a material of the support of the resistive layer 14 include polyethylene terephthalate (PET), polyethylene naphthalate (PEN), an acrylic resin, polycarbonate (PC), polyolefin, polyethylene (PE), polypropylene (PP), a cycloolefin polymer (COP), polyurethane, a urethane acrylic resin, biaxially-oriented polypropylene (BOPP) and a vinylidene chloride resin. In particular, the material of the support of the resistive layer 14 is desirably PET in terms of the balance among good heat-resistance, dimensional stability and cost. The support can be omitted from the resistive layer 14 as appropriate.

The dielectric layer 15 is formed of, for example, a polymer sheet having a relative permittivity of 1 to 20. Also, the dielectric layer 15 has a high light transmittance in order to allow the light from the light source 30 to transmit therethrough toward the mirror surface 11. More desirably, the dielectric layer 15 is formed of a polymer sheet having a relative permittivity of 2 to 20. This makes it likely that the lamp reflector 10a exhibits desired electromagnetic wave absorption characteristics. The relative permittivity of the dielectric layer 15 can be measured, for example, by a cavity resonator perturbation method.

Examples of a material of the polymer sheet of the dielectric layer 15 include a synthetic resin (including a thermoplastic elastomer) such as ethylene-vinyl acetate copolymer (EVA), polyvinyl chloride, polyurethane, an acrylic resin, an acrylic urethane resin, polyolefin, polypropylene, polyethylene, a silicone resin, polyethylene terephthalate, polyester, polystyrene, polyimide, polycarbonate, polyamide, polysulfone, polyethersulfone and an epoxy resin, and synthetic rubber such as polyisoprene rubber, butyl rubber, acrylic rubber and silicone rubber. One of these may be used alone as the material of the polymer sheet of the dielectric layer 15, or a combination of two or more thereof may be used as the material of the polymer sheet of the dielectric layer 15. In terms of decreasing the thickness of the dielectric layer 15 to decrease a thickness of the laminate 12a, polyurethane, an acrylic resin or an acrylic urethane resin is desirably used as the material of the polymer sheet of the dielectric layer 15. In terms of the moldability and relative permittivity, it is also desirable to use EVA as the material of the polymer sheet of the dielectric layer 15.

The dielectric layer 15 may be a single layer, or may be a laminate composed of a plurality of layers. In the case where the dielectric layer 15 is a laminate composed of a plurality of layers, the relative permittivity of the dielectric layer 15 can be determined by measuring the respective layers for relative permittivity, multiplying the obtained relative permittivity values of the respective layers by the proportions of the thicknesses of the respective layers to the thickness of the entirety of the dielectric layer 15, and adding the resultant values.

The electrically conductive layer 16 has a sheet resistance lower than the sheet resistance of the resistive layer 14 and has a high light transmittance. The electrically conductive layer 16 has a sheet resistance of, for example, 100Ω/□ or less. The electrically conductive layer 16 includes, for example, a layer (hereinafter referred to as a "conductive functional layer") composed of: a metal oxide containing, as a main component, at least one selected from the group consisting of indium, tin and zinc; a polymer having electrical conductivity; a carbon nanotube; a metal nanowire; or a metal mesh. In order to allow the electrically conductive layer 16 to have a high light transmittance, the conductive functional layer of the electrically conductive layer 16 is desirably composed of an indium tin oxide (ITO). In this case, the material forming the conductive functional layer of the electrically conductive layer 16 is desirably an ITO containing 5 to 15 weight % of $SnO_2$.

The electrically conductive layer 16 may further include, for example, a support supporting the conductive functional layer. In this case, the electrically conductive layer 16 can be produced, for example, by forming the conductive functional layer on the support by a layer forming method such as sputtering and coating (bar coating, for example). The support also serves as an auxiliary member capable of adjusting a thickness of the conductive functional layer with high accuracy. A material of the support of the electrically conductive layer 16 is the material of the support of the resistive layer 14, for example. The material of the support of the resistive layer 14 may be the same as the material of the support of the electrically conductive layer 16, or may be different from the material of the support of the electrically conductive layer 16. In particular, the material of the support of the electrically conductive layer 16 is desirably PET in terms of the balance among good heat-resistance, dimensional stability and cost. The support can be omitted from the electrically conductive layer 16 as appropriate.

The lamp reflector 10a is produced by, for example, adhering the laminate 12a for a reflector, which is able to adhere to the mirror surface 11, to the mirror surface 11. As shown in FIG. 2, the laminate 12a for a reflector includes, for example, an adhesive layer 17, the resistive layer 14, the dielectric layer 15 and the electrically conductive layer 16. The adhesive layer 17 is a layer for adhering the laminate 12a for a reflector to the mirror surface 11. The dielectric layer 15 is disposed between the resistive layer 14 and the adhesive layer 17. The electrically conductive layer 16 is disposed between the dielectric layer 15 and the adhesive layer 17. The laminate 12a for a reflector has, for example, a transmittance of 65% or more for light having a wavelength of 550 nm, and absorbs an electromagnetic wave having a specific frequency of 20 GHz to 90 GHz.

The adhesive layer 17 has a high light transmittance in order to allow the light from the light source 30 to transmit therethrough toward the mirror surface 11. The adhesive layer 17 is made of an acrylic adhesive, a urethane adhesive, a silicone adhesive or a rubber adhesive, for example.

The laminate 12a for a reflector is provided in the state of being wound around a core material, for example.

In the laminate 12a for a reflector, a release liner (not shown), for example, is in intimate contact with the adhesive layer 17. In this case, the adhesive layer 17 is disposed between the release liner and the electrically conductive layer 16. This makes it possible to protect the adhesive layer 17 before the laminate 12a for a reflector is adhered to the mirror surface 11. The release liner is, for example, a film made of a resin such as PET. To attach the laminate 12a for a reflector to the mirror surface 11, the release liner is removed to expose the adhesive layer 17, and then the laminate 12a for a reflector is adhered to the mirror surface 11.

In the lamp 1, the lamp reflector 10a for a reflector is disposed around the light source 30 and the mirror surface 11 of the lamp reflector 10a for a reflector may include a curved surface. Accordingly, the laminate 12a for a reflector desirably has characteristics that are advantageous for being adhered to a curved surface. The laminate 12a for a reflector has a flexural rigidity of 7000 MPa·mm$^4$ or less, for example. This flexural rigidity means a flexural rigidity in the state in which the release liner has been removed in the case where the laminate 12a for a reflector includes the release liner. A flexural rigidity EI [MPa·mm$^4$] of the laminate 12a for a reflector can be determined in such a manner that one end of a test sample is fixed to form a cantilever, a downward load is applied by a weight at another end of the test sample to bend and deform the test sample, a resultant deflection d [cm] is measured, and the flexural rigidity EI [MPa·mm$^4$] is calculated according to the following equation (2). In the following equation (2), W represents a basis weight [g/m$^2$] of the test sample, L represents a length [cm]

of the test sample, b represents a width [cm] of the test sample, F represents a weight [g] of the weight, and d represents the deflection [cm].

$$EI=\{(WLb/8)\times10^{-4}+(F/3)\}\times(L^3/d)\times(9.81/10) \qquad \text{Equation (2)}$$

The laminate 12a for a reflector has a flexural rigidity of desirably 10 to 5000 MPa·mm⁴, more desirably 70 to 3500 MPa·mm⁴, even more desirably 80 to 3000 MPa·mm⁴, and particularly desirably 80 to 1000 MPa·mm⁴

<Modification>

The lamp reflector 10a can be modified in various respects. For example, the lamp reflector 10a may be modified into a lamp reflector 10b shown in FIG. 4. The lamp reflector 10b is configured in the same manner as the lamp reflector 10a unless otherwise described. The components of the lamp reflector 10b that are identical to or corresponding to the components of the lamp reflector 10a are indicated by the same reference numerals and detailed descriptions thereof are omitted. The descriptions given for the lamp reflector 10a are applicable to the lamp reflector 10b unless there is a technical inconsistency.

Figure 4:
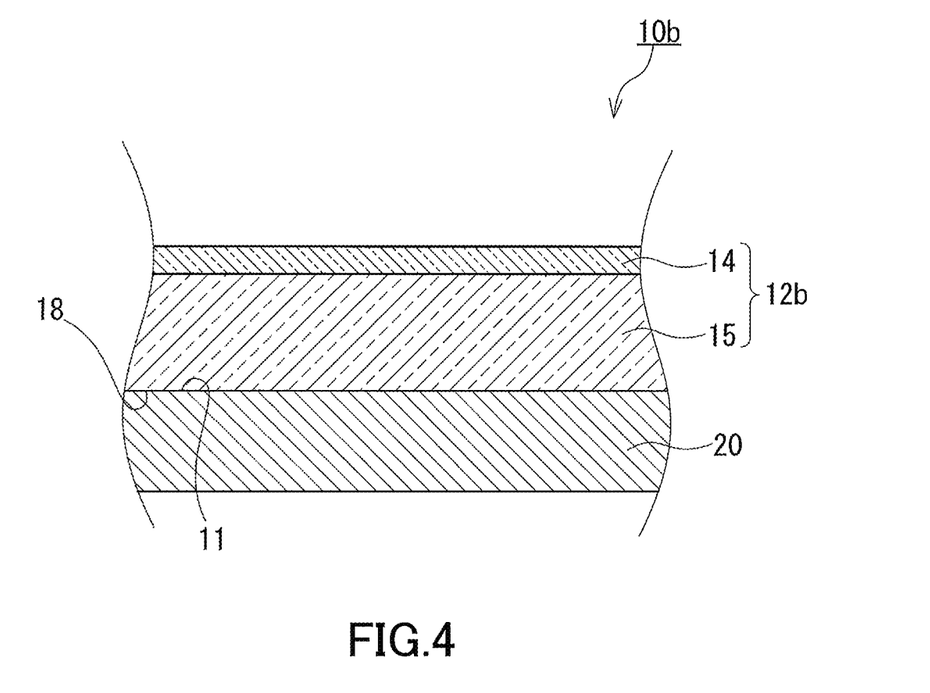
FIG. 4 is a cross-sectional view showing a lamp reflector according to another example of the present invention.

The lamp reflector 10b includes a laminate 12b. The laminate 12b is disposed in contact with the mirror surface 11. The laminate 12b is a laminate for absorbing an electromagnetic wave having a specific frequency of 20 GHz to 90 GHz. In addition, the laminate 12b allows the light from the light source 30 to transmit therethrough toward the mirror surface 11.

The laminate 12b includes the resistive layer 14 and the dielectric layer 15. The dielectric layer 15 is disposed between the resistive layer 14 and the mirror surface 11. The mirror surface 11 has electrical conductivity. Although the laminate 12b does not include the electrically conductive layer 16 of the lamp reflector 10a, the electromagnetic wave having a specific frequency is subject to back surface reflection by the mirror surface 11 in the same manner as by the electrically conductive layer 16 because the mirror surface 11 has electrical conductivity, allowing the lamp reflector 10b to absorb the electromagnetic wave having a specific frequency of 20 GHz to 90 GHz. Since the electromagnetic wave to be absorbed can be reflected by the mirror surface 11 in this case, the electrically conductive layer 16 can be omitted and the laminate 12b can be reduced in thickness.

The lamp reflector 10b is produced, for example, by adhering the laminate 12b for a reflector, which is able to adhere to the mirror surface 11 having electrical conductivity, to the mirror surface 11. As shown in FIG. 4, the laminate 12b for a reflector includes, for example, an adhesive surface 18, the resistive layer 14 and the dielectric layer 15. The adhesive surface 18 is a surface that is able to adhere to the mirror surface 11. The dielectric layer 15 defines the adhesive surface 18, for example. In this case, a material that is able to adhere to the mirror surface 11 is selected as the material of the dielectric layer 15. The dielectric layer 15 may be disposed in contact with a layer that defines the adhesive surface 18. In this case, the laminate 12b for a reflector includes an adhesive layer, for example, and the dielectric layer 15 is disposed between the resistive layer 14 and the adhesive layer. The adhesive layer is the layer that defines the adhesive surface 18. In each case, the laminate 12b for a reflector has a transmittance of 65% or more for light having a wavelength of 550 nm. Thereby, the light from the light source 30 transmits the laminate 12b for a reflector and is reflected by the mirror surface 11.

In the case where the adhesive surface 18 is defined not by the dielectric layer 15 but by the adhesive layer, the adhesive layer has a high light transmittance in order to allow the light from the light source 30 to transmit therethrough toward the mirror surface 11. The adhesive layer is made of, for example, an acrylic adhesive, a urethane adhesive, a silicone adhesive or a rubber adhesive.

The laminate 12b for a reflector has, for example, a flexural rigidity of 7000 MPa·mm⁴ or less, and desirably 10 to 5000 MPa·mm⁴, more desirably 70 to 3500 MPa·mm⁴, even more desirably 80 to 3000 MPa·mm⁴, and particularly desirably 80 to 1000 MPa·mm⁴.

EXAMPLES

Hereinafter, the present invention will be described in more detail with reference to examples. The present invention is not limited to the examples given below.

Example 1

On a film-like support (Mitsubishi DIAFOIL with a thickness of 38 μm, available from Mitsubishi Chemical Polyester Co., Ltd.) made of polyester, a resistive functional layer was formed by sputtering using an ITO containing 30 weight % of $SnO_2$ so as to have a sheet resistance of 380Ω/□. A resistive layer according to Example 1 was thus produced. On a film-like support (Mitsubishi DIAFOIL with a thickness of 38 μm, available from Mitsubishi Chemical Polyester Co., Ltd.) made of polyester, a conductive functional layer was formed by sputtering using an ITO containing 10 weight % of $SnO_2$ so as have a sheet resistance of 20Ω/□. An electrically conductive layer according to Example 1 was thus produced. An acrylic resin (KURARITY LA2330 available from KURARAY CO., LTD.) was press-molded to have a thickness of 560 μm, and a dielectric layer according to Example 1 was thus produced. The dielectric layer according to Example 1 had a relative permittivity of 2.55. The dielectric layer according to Example 1 was placed on the conductive functional layer, which was made of an ITO, of the electrically conductive layer according to Example 1. Next, the resistive functional layer was brought into contact with the dielectric layer according to Example 1 so that the resistive layer according to Example 1 was placed on the dielectric layer according to Example 1. A 0.05-mm-thick transparent adhesive sheet (CS 9862 UA available from Nitto Denko Corporation) was adhered to the support of the electrically conductive layer according to Example 1 to obtain a laminate for a reflector according to Example 1. As an adherend to which the laminate for a reflector according to Example 1 was to be adhered, an aluminum-deposited film (product name: CP WS20, substrate: a biaxially-oriented polypropylene (BOPP) film, thickness of the substrate: 20 μm, available from Mitsui Chemicals Tohcello, Inc.) was prepared. The transparent adhesive sheet of the laminate for a reflector according to Example 1 was brought into contact with the aluminum-deposited film. A sample according to Example 1 was thus obtained.

Example 2

The dielectric layer according to Example 1 was placed on the resistive functional layer, which was made of an ITO, of the resistive layer according to Example 1. A laminate for a reflector according to Example 2 was thus obtained. As an adherend to which the laminate for a reflector according to Example 2 was to be adhered, an aluminum foil-including PET film, available from UACJ Corporation, in which a 25-μm-thick PET layer, a 7-μm-thick aluminum foil and a 9-μm-thick PET layer were stacked in this order, was prepared. The dielectric layer was brought into contact with the 25-μm-thick PET layer of the aluminum foil-including PET film so that the laminate for a reflector according to Example 2 was adhered to the adherend. A sample according to Example 2 was thus obtained.

Example 3

A sample according to Example 3 was obtained in the same manner as in Example 2, except that an aluminum-deposited film (product name: CP WS20, substrate: a biaxially-oriented polypropylene (BOPP) film, thickness of the substrate: 20 μm, available from Mitsui Chemicals Tohcello, Inc.) was used as the adherend. The dielectric layer was brought into contact with an aluminum-deposited membrane of the aluminum-deposited film.

Comparative Example 300 parts by weight of a carbonyl iron powder YW1 available from New Metals and Chemicals Corporation, Ltd. was added to 100 parts by weight of an acrylic resin (KURARITY LA2330 available from KURARAY CO., LTD.). The resultant mixture was kneaded with a mixing roll and then press-molded at 120° C. to produce a sheet-shaped dielectric layer (a dielectric layer according to Comparative Example) having a thickness of 1200 μm. The dielectric layer according to Comparative Example had a relative permittivity of 6.60. A laminate according to Comparative Example was obtained in the same manner as in Example 2, except that the dielectric layer according to Comparative Example was used instead of the dielectric layer according to Example 1. A sample according to Comparative Example was obtained in the same manner as in Example 2, except that the laminate according to Comparative Example was used instead of the laminate for a reflector according to Example 2.

Reference Example

As a dielectric layer according to Reference Example, a polycarbonate (PC) sheet, available from SUMIKAACRYL CO., LTD., having a thickness of 500 μm was prepared. The dielectric layer according to Reference Example had a relative permittivity of 2.90. The resistive layer according to Example 1 and the electrically conductive layer according to Example 1 were adhered to the dielectric layer according to Reference Example, with a transparent adhesive sheet (CS 9861 US available from Nitto Denko Corporation) being present between one principal surface of the dielectric layer according to Reference Example and the resistive layer according to Example 1 as well as with a transparent adhesive sheet (CS 9861 US available from Nitto Denko Corporation) being present between another principal surface of the dielectric layer according to Reference Example and the electrically conductive layer according to Example 1. A laminate according to Reference Example was thus obtained.

[Light Transmittance]

The laminate for a reflector according to Example 1, the laminate for a reflector according to Example 2 and the laminate according to Comparative Example were measured for transmittance for light having a wavelength of 550 nm under a condition at a temperature of 25° C. by using a spectrophotometer (product name: U-4100, available from Hitachi High-Technologies Corporation). Each of the laminates was measured as above 5 times and the average thereof was determined as the light transmittance that each of the laminates had for light having a wavelength of 550 nm. Table 1 shows the results.

[Light Reflection Characteristics]

The samples according to Examples 1 to 3, the sample according to Comparative Example and the sample according to Reference Example were observed visually to see whether the metallic luster of each of the adherends was visually recognizable, and each of the samples according to Examples, Comparative Example and Reference Example was evaluated for light reflection characteristics in accordance with the following measures.

a: Metallic luster was visually recognizable.

x: No metallic luster was visually recognizable.

[Electromagnetic Wave Absorption Characteristics]

An amount of reflection and absorption (the absolute value of an amount of reflection) was measured, in accordance with JIS R 1679:2007, when a 76-GHz millimeter wave was incident on each of the samples according to Examples 1 to 3, the sample according to Comparative Example and the sample according to Reference Example at an incident angle of 15°. The amount of reflection and absorption measured was 20 dB or more on each of the samples.

[Bending Properties and Adhesiveness]

Each of the samples according to Examples 1 to 3, the sample according to Comparative Example and the laminate according to Reference Example was attempted to be adhered to a steel plate bent to R75 (curvature radius: 75 mm) using a 0.05-mm-thick transparent adhesive sheet (CS9862UA available from Nitto Denko Corporation). The state of each of the samples according to Examples 1 to 3, the sample according to Comparative Example and the laminate according to Reference Example in this case was observed and evaluated in accordance with the following measures. Table 1 shows the results.

a: The electromagnetic wave absorber deformed along a curved face of the steel plate and was fit tightly to the steel plate after adhered thereto.

x: The electromagnetic wave absorber failed to deform along a curved face of the steel plate, and it was difficult to adhere the electromagnetic wave absorber.

[Relative Permittivity of Dielectric Layer]

Each of the dielectric layers according to Example 1, Comparative Example and Reference Example was measured for relative permittivity at 10 GHz by a cavity resonator perturbation method using a network analyzer (product name: N5230C, available from Agilent Technologies, Inc.) and a cavity resonator (cavity resonator CP531 available from Kanto Electronics Application Development Inc.). Table 1 shows the results.

[Flexural Rigidity]

One end of each of the electromagnetic wave absorbers according to Examples 1 to 3 was fixed to form a cantilever, a downward load was applied by a weight at another end of the electromagnetic wave absorber to bend and deform the electromagnetic wave absorber, and a resultant deflection d [cm] was measured. A flexural rigidity EI [MPa·mm$^4$] was calculated according to the following equation (3). In the following equation (3), W represents a basis weight [g/m$^2$] of the test sample, L represents a length [cm] of the test sample, b represents a width [cm] of the test sample, F represents a weight [g] of the weight, and d represents the deflection [cm].

$$EI=\{(WLb/8)\times 10^{-4}+(F/3)\}\times(L^3/d)\times(9.81/10) \quad \text{Equation (3)}$$

As shown in Table 1, comparisons between Examples 1 to 3 and Comparative Examples 1 reveal that the laminate for a reflector according to each of Examples 1 to 3 exhibits a good light transmittance and allows preferably the light from the light source to transmit therethrough toward the mirror surface. In addition, comparisons between Examples 1 to 3 and Reference Example reveal that the laminate for a reflector according to each of Examples 1 to 3 can be adhered easily also to a mirror surface including a curved surface.

TABLE 1

|  | Light transmittance [%] | Light reflection characteristics | Bending properties and adhesiveness | Relative permittivity of dielectric layer | Flexural rigidity [MPa · mm⁴] |
|---|---|---|---|---|---|
| Example 1 | 65 | a | a | 2.55 | 1300 |
| Example 2 | 70 | a | a | 2.55 | 2700 |
| Example 3 | 70 | a | a | 2.55 | 70 |
| Comparative Example | 0 | x | a | 6.60 | |
| Reference Example | 72 | a | x | 2.90 | |

The invention claimed is:

1. A lamp reflector comprising:
    a mirror surface for reflecting light from a light source to guide the light in a predetermined direction; and
    a laminate that covers at least a part of the mirror surface to absorb an electromagnetic wave having a specific frequency of 20 GHz to 90 GHz and allows the light from the light source to transmit therethrough toward the mirror surface.

2. The lamp reflector according to claim 1, wherein an amount of reflection and absorption with respect to the electromagnetic wave having the specific frequency is 15 dB or more.

3. The lamp reflector according to claim 1, wherein the laminate includes a resistive layer, a dielectric layer that is disposed between the resistive layer and the mirror surface, and an electrically conductive layer that is disposed between the dielectric layer and the mirror surface.

4. The lamp reflector according to claim 1, wherein
    the laminate includes a resistive layer and a dielectric layer that is disposed between the resistive layer and the mirror surface, and
    the mirror surface has electrical conductivity.

5. A laminate for a reflector, the laminate being able to adhere to a mirror surface that reflects light from a light source to guide the light in a predetermined direction in a lamp, comprising:

an adhesive layer for adhering the laminate to the mirror surface;
    a resistive layer;
    a dielectric layer that is disposed between the resistive layer and the adhesive layer; and
    an electrically conductive layer that is disposed between the dielectric layer and the adhesive layer, wherein
    the laminate has a transmittance of 65% or more for light having a wavelength of 550 nm, and absorbs an electromagnetic wave having a specific frequency of 20 GHz to 90 GHz.

6. A laminate for a reflector, the laminate being able to adhere to an electrically conductive mirror surface that reflects light from a light source to guide the light in a predetermined direction in a lamp, comprising:
    an adhesive surface that is able to adhere to the mirror surface;
    a resistive layer; and
    a dielectric layer that defines the adhesive surface or that is disposed in contact with a layer defining the adhesive surface, wherein
    the laminate for a reflector has a transmittance of 65% or more for light having a wavelength of 550 nm.

* * * * *